April 4, 1950     W. G. LUNDQUIST ET AL     2,502,968
INDUCTION SYSTEM DRAIN
Filed March 27, 1946     2 Sheets-Sheet 1
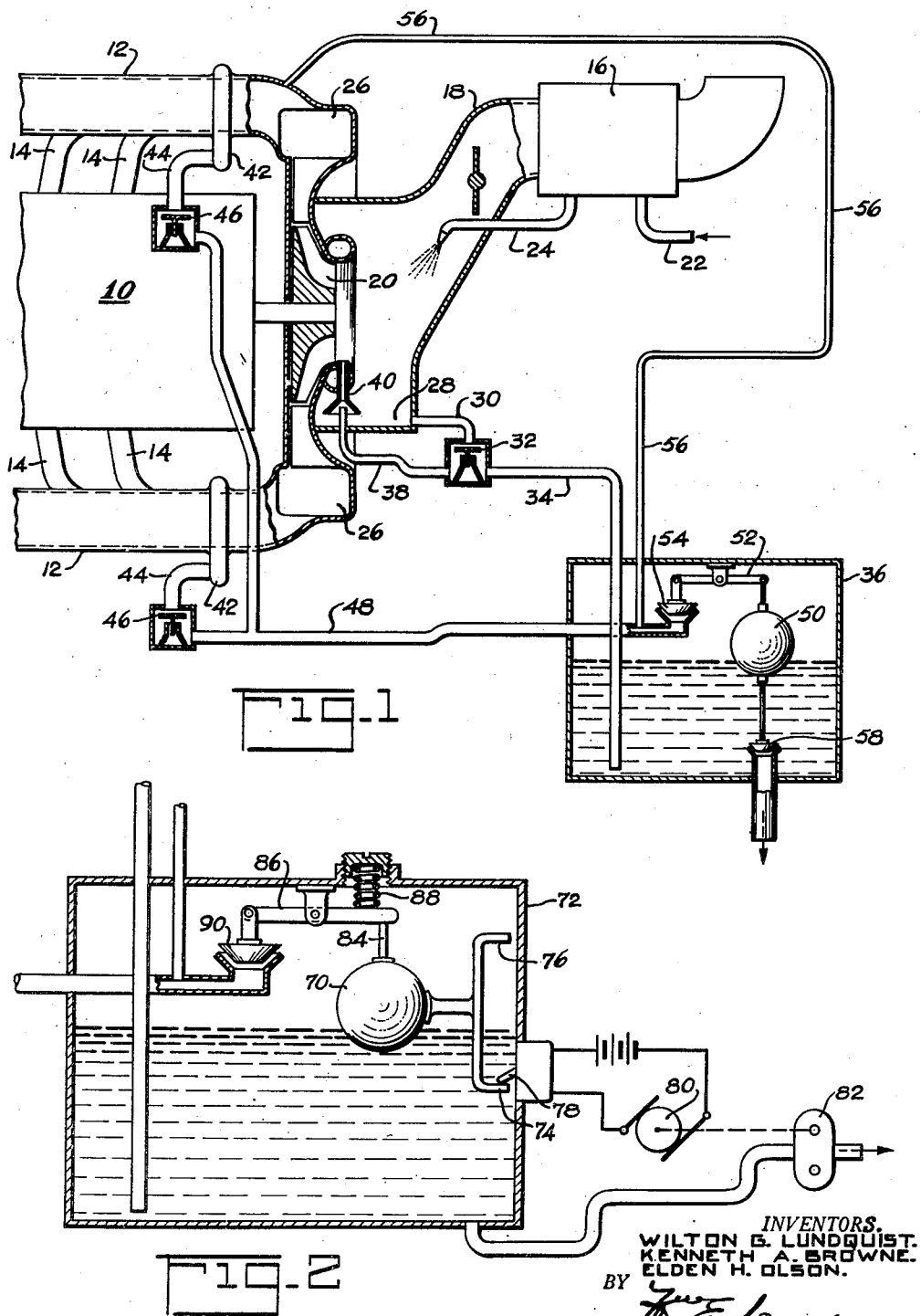
INVENTORS.
WILTON G. LUNDQUIST.
KENNETH A. BROWNE.
ELDEN H. OLSON.
BY
ATTORNEY Patented Apr. 4, 1950

2,502,968

UNITED STATES PATENT OFFICE 2,502,968

INDUCTION SYSTEM DRAIN

Wilton G. Lundquist, Hohokus, and Elden H. Olson, Preakness, N. J., and Kenneth A. Browne, Lakewood, Ohio, assignors to Wright Aeronautical Corporation, a corporation of New York Application March 27, 1946, Serial No. 657,586

9 Claims. (Cl. 123—119)

This invention relates to internal combustion engines and is particularly directed to means for preventing the accumulation of liquid fuel in the engine induction system.

In a conventional internal combustion engine, liquid fuel is vaporized upon introduction into the engine induction system. In such engines, and particularly during the starting and idling operations, a substantial amount of liquid or unvaporized fuel collects in pockets in the engine induction system. It is an object of this invention to provide a novel arrangement for preventing accumulation of this liquid fuel in pockets within the engine induction system.

Specifically, the invention comprises an arrangement whereby the liquid fuel settling into a pocket or pockets within the engine induction system drains into a container. In addition, means are provided for emptying the container before the next starting operation.

Other objects of this invention will become apparent upon reading the annexed detailed description in connection with the drawing in which:

Figure 1 is a schematic view embodying the invention; and

Figures 2 and 3 are illustrated modifications of Figure 1.

Figure 3:
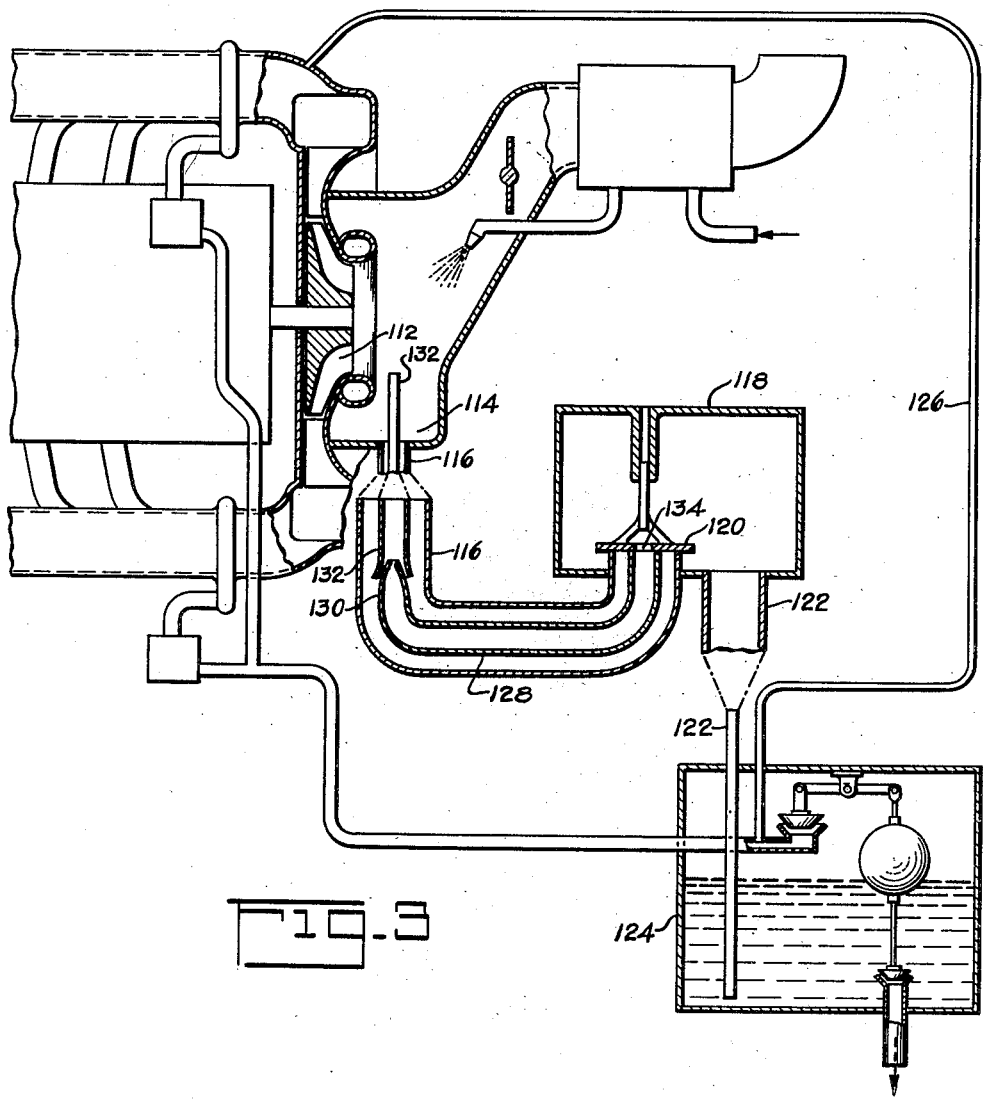

Referring first to Figure 1, 10 designates a conventional internal combustion engine having intake manifolds 12 from which the combustion mixture is delivered to the various engine cylinders through intake pipes 14. The air for combustion within the engine passes through a carburetor 16 into a duct 18 which communicates with the fluid entrance of the impeller 20 of an engine driven supercharger. Liquid fuel is supplied to the carburetor 16 through a conduit 22 and the carburetor regulates the flow of fuel in accordance with the airflow, the liquid fuel discharging from the carburetor into a conduit 24 from which it is sprayed as a vapor into the air system in the duct 18.

The duct 18 communicates with the entrance end of the supercharger impeller 20 which takes the combustion mixture from the duct 18 and compresses the mixture into the annular supercharger discharge chamber 26 from which the mixture is supplied to the manifolds 12. In the usual supercharger construction, a pocket 28 is formed below its entrance and during engine starting and/or idling operation, liquid fuel collects in this pocket. This liquid fuel may be picked up by the supercharger in an uncontrolled manner thereby causing erratic engine operation. Also, if large quantities of liquid fuel enter a cylinder, the liquid may be sufficient to fill up the clearance volume in the cylinder whereby damage to the engine may result on the next outward stroke of the piston.

With the present invention, the pocket 28 has a drain conduit 30. A check valve 32 is disposed so as to permit flow from the conduit 30 to a second drain conduit 34 but not in reverse direction. The second drain conduit 34 opens into the bottom of a tank 36. Also, a conduit 38 provides a by-pass passage around the check valve 32. The conduit 38 opens into the pocket 28 above its bottom surface and may extend directly up in front of the supercharger impeller 20. However, as illustrated, the conduit 38 opens into an ejector tube 40 which extends up in front of the impeller entrance. As illustrated, the lower end of the ejector tube 40 flares out around the open end of the conduit 38.

The manifolds 12 are provided with traps or pockets 42 into which drains liquid fuel which passes through the supercharger impeller 20. The traps 42 are provided with drain conduits 44 each having a check valve 46 permitting the flow of fuel therethrough from the conduits 44 but not in a reverse direction. The other side of the check valve 46 are in communication with a drain conduit 48 which opens into the upper portion of the container 36. The container end of the conduit 48 is normally open but when the container 36 is almost full of fuel, a float 50 is operative through a lever 52 to move a valve 54 to close the end of the conduit 48.

A conduit 56 establishes communication between one of the manifolds 12 and the container 36. The container end of the conduit 54 opens into the conduit 48 which normally communicates with the interior of the container 36. As illustrated, the float 50 is also arranged to operate a drain valve 58 when the tank becomes substantially full.

With the aforedescribed construction, during engine starting and engine idling operation, fuel accumulates in the pockets 28 and drains into the container 36. Similarly, any fuel which accumulates in the pockets or traps 42 drains into the container 36. When the engine power is increased and the manifold pressure increases sufficiently, the manifold pressure acting on the surface of the fuel within the container 36 is effective to force the fuel up the conduit 34 through the by-pass conduit 38 and into the ejector tube 40 from which it discharges in front of the impeller 20. The ejector tube 40 draws air therein through its flared bottom thereby helping to vaporize or atomize the fuel before it enters into the supercharger impeller. In this way, after the engine is operating at powers above its idling range, the engine manifold pressure forces fuel from the container 36 back into the air stream.

Because of prolonged starting or idling operations, the container 36 may become substantially full of fuel before the engine manifold pressure has been raised to a value sufficient to empty the container. When this happens, the float 50 is operative to open the drain valve 58 to empty the container 36. In this way, the container 36 never fills beyond a predetermined level. Obviously, instead of operating a drain valve, the float 50 instead may initiate operation of a pump to empty the container—for example, as hereinafter described.

At the same time that the float 50 is operative to open the drain valve 58 to empty the container 36, it also moves the valve 54 to close the open end of the conduit 48. In this way, if the engine manifold pressure is below atmospheric pressure when the drain valve 58 opens, closure of the valve 54 prevents liquid fuel from being sucked directly into the engine intake manifolds 12 from the container 36.

With the above construction, under normal conditions, the container 36 is emptied after each starting operation by the engine manifold pressure forcing the fuel in the container 36 back into the engine induction system. Only under abnormal starting or idling conditions does the container 36 become full of fuel, whereupon float 50 opens the drain valve 58 to empty the container 36 into the surrounding atmosphere. Even this overboard drainage may be avoided by having the float 50 initiate operation of a pump to empty the container, for example, into a regular engine fuel tank when the container 36 becomes substantially full. This modification is schematically illustrated in Figure 2.

In Figure 2, a float 70 in a container 72 is constrained to move in a vertical path by means not shown and is provided with spaced projections 74 and 76 adapted to actuate a toggle switch by moving the handle 78 of the switch. The arrangement is such that, when the container 72 is substantially full, the projection 74 engages the toggle switch handle 78 to close the switch thereby completing a circuit to an electric motor 80. The motor 80 is drivably connected to a pump 82 which is adapted to pump fuel from the container 72 to, for example, a regular engine fuel tank (not shown). The toggle switch 78 remains closed until the container 72 is substantially empty, whereupon the float projection 76 engages the toggle switch handle 78 to open the switch and interrupt the pump operation.

The float 70 is also provided with a stem 84 adapted to engage a lever 86 for actuating the lever against a spring 88 to close a valve 90 when the container 72 is substantially full. The valve 90 corresponds to the valve 54 of Figure 1. Accordingly, it should be apparent that, except for the above description of Figure 2, this modification is similar to Figure 1.

A further modification of Figure 1 is illustrated in Figure 3. In this modification, the intake passage 110 of the supercharger impeller 112 has a pocket 114 in which liquid fuel is apt to collect. The pocket 114 of Figure 3 corresponds to the pocket 28 of Figure 1 and is provided with a drain conduit 116 which terminates in a valve housing 118. A check valve 120 within the housing 118 is arranged to permit flow of fuel from the conduit 116 into the housing 118. A conduit 122 establishes communication between the valve housing 118 and a container 124 into which the fuel collects. The container 124 is subjected to engine manifold pressure through a conduit 126 as in Figure 1.

A conduit 128 consecutively disposed within the conduit 116 terminates in an upwardly directed nozzle 130. An ejector tube 132 has a flared bottom portion disposed about the nozzle 130 and the tube extends up and ends in front of the supercharger impeller 112. The check valve 120 is provided with a central opening 134 so that it does not close the conduit 128. In this way, the conduit 128 provides a by-pass passage around the check valve 120 similar to the by-pass passage provided by the conduit 38 of Figure 1.

With this construction, fuel can drain from the pocket 114, down the conduit 116, outside the conduits 132 and 128, past the check valve 120, through the conduit 122 and into the container 124. When the engine manifold pressure builds up sufficiently, this pressure acts on the fuel within the container to force the fuel up the conduit 122 into the conduit 128, the check valve 120 closing to prevent fuel flow through the conduit 116 outside the conduit 128. The nozzle 130 helps to atomize or vaporize the liquid fuel which discharges upwardly into the ejector tube 132 and thence into the airstream in front of the impeller 112. The ejector tube 132 may also draw air therein through its flared bottom to help vaporize the fuel. The operation of Figure 3 is otherwise similar to Figure 1. Also, the container 124 of Figure 3 may be emptied by a pump as illustrated in Figure 2.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with an internal combustion engine adapted to burn a vaporized fuel and having a supercharger for the engine induction system, said engine having a pocket adjacent the entrance to said supercharger in which liquid fuel is apt to collect, a receptacle, a check valve in a passage between said pocket and receptacle arranged to permit flow of fuel from said pocket into said receptacle but not in the reverse direction, said passage opening into said receptacle adjacent its bottom, a by-pass passage around said valve having its ends in communication respectively with the entrance to said supercharger and with said first-mentioned passage between said valve and receptacle, a passage establishing communication between the discharge side of said supercharger and said receptacle adjacent the top thereof, means automatically operative when said receptacle is substantially full of fuel to cause said receptacle to empty, and means simultaneously operable with said last-mentioned means for closing said last-mentioned passage.

2. In combination with an internal combustion engine adapted to burn a vaporized fuel and having a supercharger for the engine induction system, said engine having a pocket adjacent the entrance to said supercharger in which liquid fuel is apt to collect, a receptacle, means providing a passage having one end opening into the bottom of said pocket and having its other end opening into said receptacle adjacent its bottom, a check valve in said passage arranged to permit flow from said pocket to said receptacle but not in the reverse direction, a by-pass passage around said valve having its ends in communication respectively with the entrance to said supercharger and with said first-mentioned passage between said valve and receptacle, and means arranged to subject said receptacle to a pressure of the engine induction system on the discharge side of said supercharger.

3. In combination with an internal combustion engine adapted to burn a vaporized fuel and having a supercharger for the engine induction system, said engine having a pocket adjacent the entrance to said supercharger in which liquid fuel is apt to collect, a receptacle, means providing a passage having one end opening into the bottom of said pocket and its other end opening into said receptacle adjacent its bottom, a check valve in said passage arranged to permit flow from said pocket to said receptacle but not in the reverse direction, a by-pass passage around said valve, an ejector tube having its discharge end at the entrance to said supercharger and having its inlet end flared about the discharge end of said by-pass passage, and means arranged to subject said receptacle to a pressure of the engine induction system on the discharge side of said supercharger.

4. In combination with an internal combustion engine adapted to burn a vaporized fuel and having a supercharger for the engine induction system, said engine having a pocket adjacent the entrance to said supercharger in which liquid fuel is apt to collect, a receptacle, means providing a passage having one end opening into the bottom of said pocket and its other end opening into said receptacle adjacent its bottom, a check valve in said passage arranged to permit flow from said pocket to said receptacle but not in the reverse direction, a by-pass passage around said valve, said by-pass passage including an ejector having its discharge end in communication with the entrance to said supercharger, and means arranged to subject said receptacle to a pressure of the engine induction system on the discharge side of said supercharger.

5. In combination with an internal combustion engine adapted to burn a vaporized fuel and having a supercharger for the engine induction system, said engine having a pocket adjacent the entrance to said supercharger in which liquid fuel is apt to collect, a receptacle, means providing a passage having one end opening into the bottom of said pocket and having its other end opening into said receptacle adjacent its bottom, a check valve in said passage arranged to permit flow of fuel from said pocket into said receptacle but not in the reverse direction, a by-pass passage around said valve, a passage establishing communication between the discharge side of said supercharger and said receptacle, a pocket in the engine induction system on the discharge side of said supercharger in which liquid fuel may collect, a passage establishing communication between said last-mentioned pocket and said receptacle, and a check valve in said passage arranged to permit the flow of fuel from said pocket to said receptacle but not in the reverse direction.

6. In combination with an internal combustion engine adapted to burn a vaporized fuel; said engine having a pocket in its induction system in which liquid fuel is apt to collect; a receptacle; means providing a passage having one end opening into the bottom of said pocket and having its other end opening into said receptacle adjacent its bottom; a check valve in said passage arranged to permit flow from said pocket to said receptacle but not in the reverse direction; a by-pass passage around said valve having its ends in communication respectively with a portion of said induction system adjacent said pocket and with said first mentioned passage between said valve and said receptacle; and means arranged to subject said receptacle to the pressure of a portion of the engine induction system having a higher pressure, during engine operation, than that adjacent said pocket.

7. In combination with an internal combustion engine adapted to burn a vaporized fuel; said engine having a pocket in its induction system in which liquid fuel is apt to collect; a receptacle; means providing a passage having one end opening into the bottom of said pocket and having its other end opening into said receptacle adjacent its bottom; a check valve in said passage arranged to permit flow from said pocket to said receptacle but not in the reverse direction; a by-pass passage around said valve having its ends in communication respectively with a portion of said induction system adjacent said pocket and with said first mentioned passage between said valve and said receptacle; means arranged to subject said receptacle to the pressure of a portion of the engine induction system having a higher pressure, during engine operation, than that adjacent said pocket; and means automatically operative when said receptacle is substantially full of fuel to cause said receptacle to empty.

8. In combination with an internal combustion engine adapted to burn a vaporized fuel; said engine having a pocket in its induction system in which liquid fuel is apt to collect; a receptacle; means providing a passage having one end opening into the bottom of said pocket and having its other end opening into said receptacle adjacent its bottom; a check valve in said passage arranged to permit flow from said pocket to said receptacle but not in the reverse direction; a by-pass passage around said valve having its ends in communication respectively with a portion of said induction system adjacent said pocket and with said first mentioned passage between said valve and said receptacle; means providing a passage having one end communicating with the upper portion of said receptacle and having its other end communicating with a portion of the induction system having a higher pressure, during engine operation, than that adjacent said pocket; and means to prevent fuel flow from said receptacle through said last-mentioned passage.

9. In combination with an internal combustion engine adapted to burn a vaporized fuel and having a supercharger for the engine induction system; said engine having a pocket adjacent to the entrance to said supercharger in which liquid fuel is apt to collect; a receptacle; means providing a passage having a first portion opening into the bottom of said pocket and having a second portion opening into said receptacle adjacent to the bottom of said receptacle; a check valve in said passage between said first and second portions, said check valve being arranged to permit flow through said passage from said pocket to said receptacle but not in the reverse direction; a by-pass passage around said valve having its one end in communication with the entrance to said supercharger above the open end of said first portion of the first-mentioned passage and having its other end in communication with the second portion of said first-mentioned passage between said valve and receptacle, said by-pass passage being substantially unrestricted so that fuel can drain from said pocket through said first-mentioned passage and its check valve regardless of the pressure at the entrance to said supercharger; and means arranged to subject said receptacle to a pressure of the engine induction system on the discharge side of said supercharger.

WILTON G. LUNDQUIST.
    ELDEN H. OLSON.
    KENNETH A. BROWNE.

REFERENCES CITED

The following references are of record in the file of this patent:

UNITED STATES PATENTS

| Number | Name | Date |
|---|---|---|
| 583,399 | Lewis | May 25, 1897 |
| 2,026,182 | Leak | Dec. 31, 1935 |
| 2,083,752 | Trussell | June 15, 1937 |